Jan. 10, 1956 J. S. BROWN ET AL 2,730,190
TREATMENT OF OIL-CONTAINING WATER
Filed Feb. 8, 1952 3 Sheets-Sheet 2
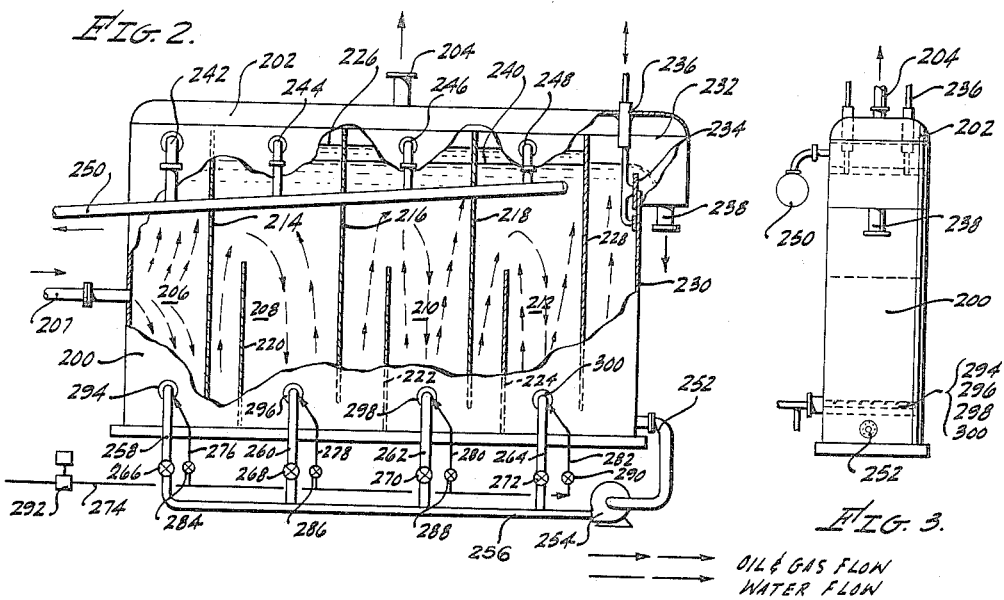
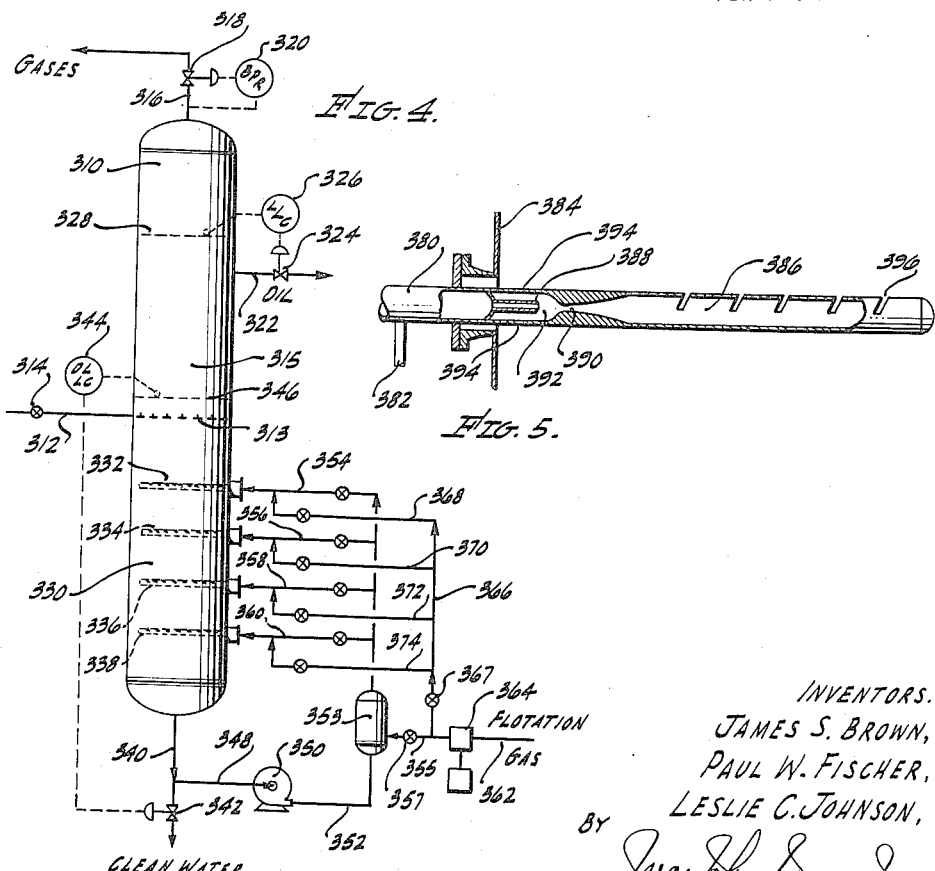
INVENTORS.
JAMES S. BROWN,
PAUL W. FISCHER,
LESLIE C. JOHNSON,
BY
AGENT.

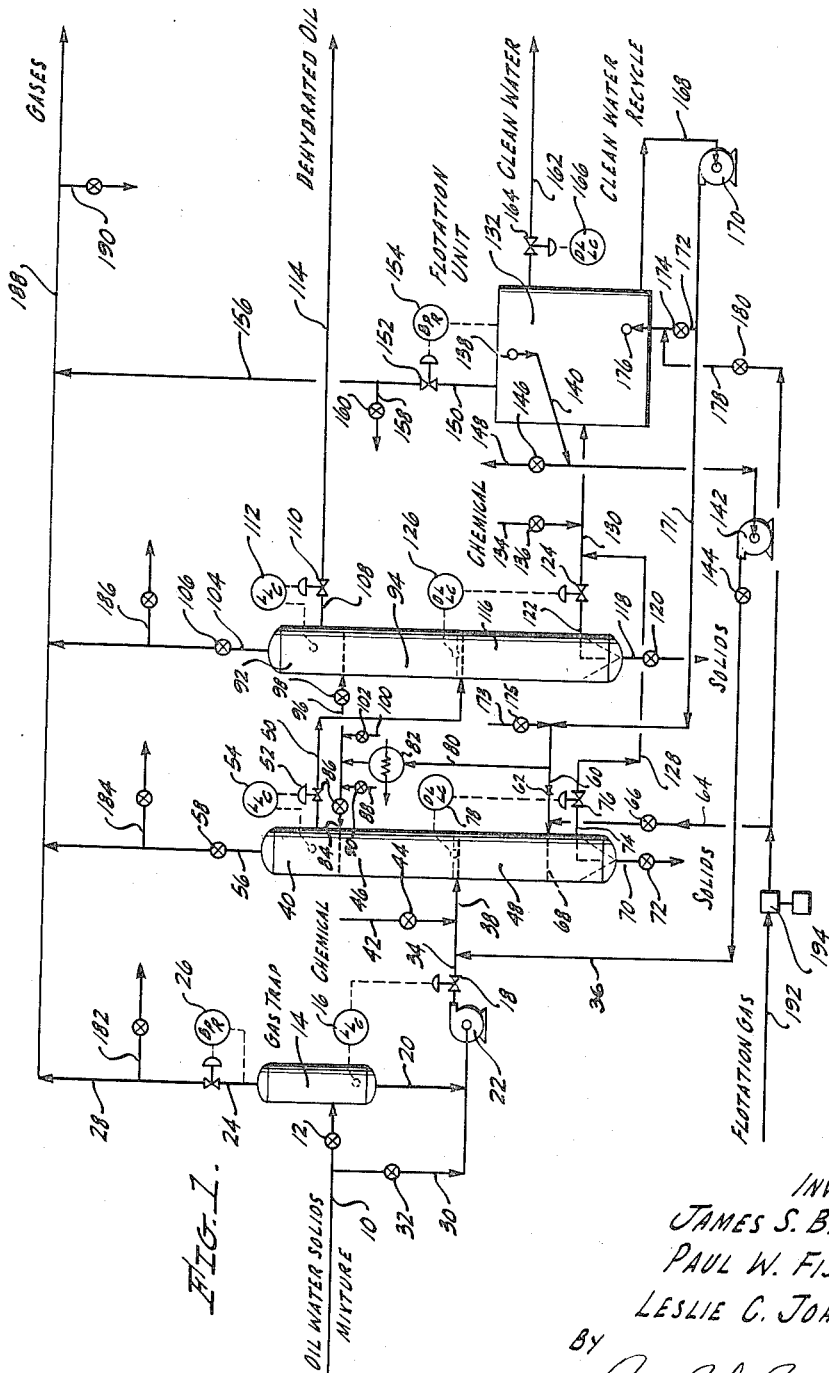

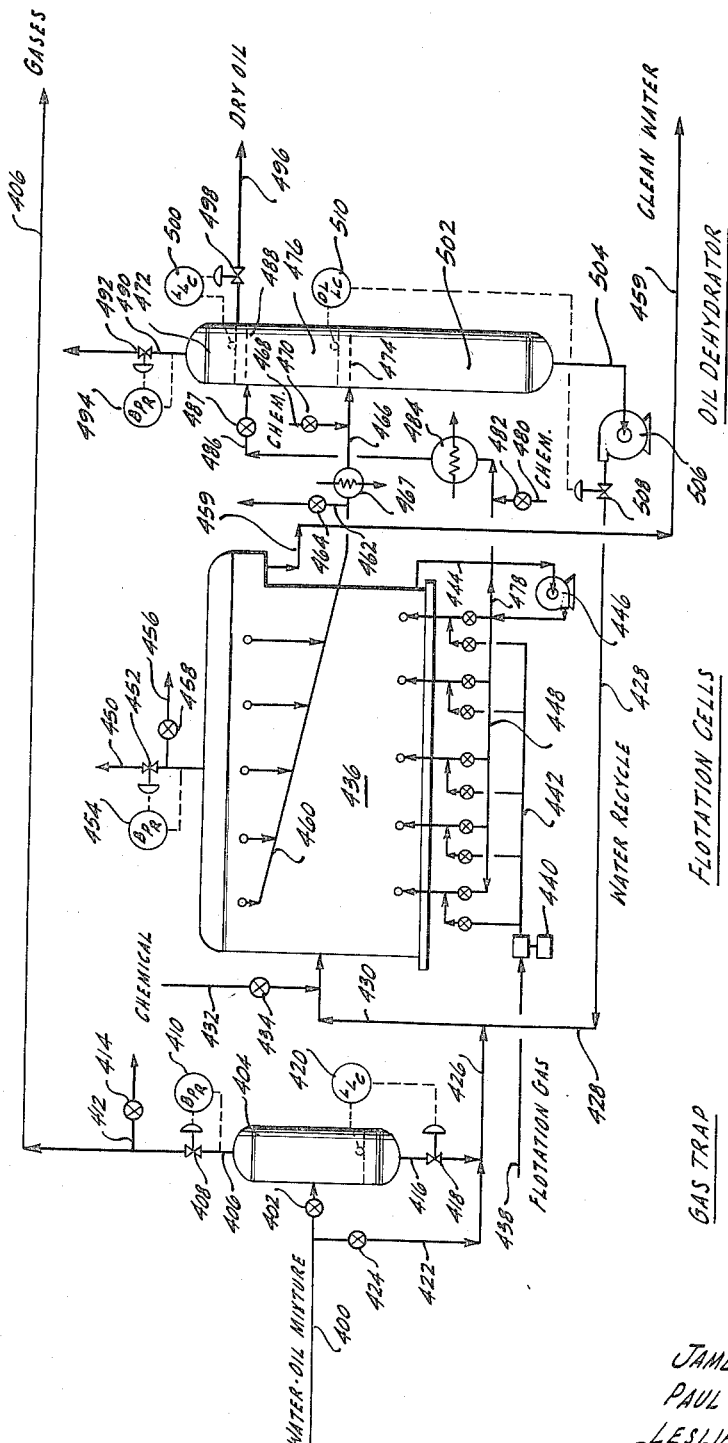

2,730,190
TREATMENT OF OIL-CONTAINING WATER

James S. Brown, San Gabriel, Paul W. Fischer, East Whittier, and Leslie C. Johnson, Redondo Beach, Calif., assignors to Union Oil Company of California, Los Angeles, Calif., a corporation of California Application February 8, 1952, Serial No. 270,726

24 Claims. (Cl. 183—2.7)

This invention relates to the purification of contaminated water and in particular relates to the removal and recovery of oils of various types from oil-contaminated water.

Water contaminated with oil is encountered in many industrial operations. The brine produced along with crude petroleum contains residual quantities of crude oil and hydrocarbonaceous materials including solids. The oil and solids and oxygen which contaminate the water must be removed before the water can be used in secondary recovery operations or discarded. Water and oil mixtures are formed during the water washing of refined petroleum fractions following such refining process as caustic or acid washing or other chemical treatment. Oil-contaminated water is also accumulated in refining operations from the drainage from the various equipment employed in petroleum refining. Water and oil mixtures are also found in the separation and refining of coal tar fractions, the retorting of shale oil from oil shales, in the recovery of fish oils from whale, shark and fish carcasses, in vitamin recovery operations, and in the steam distillation of vegetable oils and fats. The recovery of essential oils from vegetable matter and many other miscellaneous operations result in the production of water phases containing various quantities of oil contamination.

Customarily, recovery of oil from water is effected by settling, stratification, and decantation operations in which the separated oil and water phases are retreated, stored or discarded depending on circumstances. In large scale operations, open skim ponds are employed from which volatile oils may be lost to the atmosphere. Very often, particularly when the oil content of the fluid to be treated is low or dispersions or emulsions of the oil occur in the water phase, the conventional treatment does not effectively separate the oil from the water. Even following stratification operations, the water phase may contain as much as 500 parts per million of oil and yet have a clear appearance.

Three of the principal situations in which the purification of such water is desirable are: (1) where the water is to be employed in a subsequent process and the oil contamination cannot be tolerated, (2) where the contaminating oil is sufficiently valuable that recovery thereof is desirable, and (3) where local regulations establish a maximum oil contamination for waste water to be disposed of through sewers, streams, etc.

An example of the first situation is the secondary recovery operations for crude petroleum in which water is injected through an injection well into a permeable oil-containing formation to displace residual quantities of petroleum. Emulsified oil or suspended or dispersed solids contained in the injection water detrimentally affect these recovery operations, one principal problem being the plugging of the porous formation at the water injection point.

An example of the second situation lies in the recovery of vitamin A from shark and other fish liver oils wherein small quantities of these substances escaping in contaminated discarded water constitute a large economic loss.

The third situation is illustrated by the problem encountered in waste water disposal. Many times local regulations specify that before oil-contaminated waste water can be disposed of through streams, sewers, etc., the oil content must be below some stated maximum value, generally 10 to 25 p. p. m. (parts per million) of oil.

The present invention therefore is directed to an improved process and apparatus for the treatment of oil-contaminated water to effect a highly efficient removal and recovery of the oil phase whether it is present in solution, as a dispersion or as an emulsion and to produce an oil-free water.

It is a primary object of the present invention to provide an improved combination process for the removal and the recovery of oil and any associated solid particles from oil-contaminated streams of water.

It is an additional object of the present invention to provide a combination process for the treatment of oil-contaminated water in which a stream of dried oil and a stream of substantially uncontaminated water are produced.

It is an additional specific object of this invention to provide a gas agitated flotation process for the recovery of petroleum hydrocarbons from water by a combination of oil washing and flotation steps to produce clean water with an oil content reduced to values well below 10 parts per million.

Another object of this invention is to provide a particularly efficient gas agitated multi-zone flotation process for the removal and recovery of oil from oil-contaminated water.

It is a specific object of this invention to provide a multi-stage flotation process for the purification of water and the removal of oil from mixtures such as oil well brine, oil refinery waste water, and the like.

It is also a specific object of this invention to apply the principles hereinafter disclosed to the flotation separation of animal, vegetable or mineral oils from streams of water containing such materials.

Another object of this invention is to provide an apparatus adapted to accomplish the aforementioned objects.

Additional objects and advantages of this invention will become apparent to those skilled in the art as the description and illustration thereof proceed.

Briefly, the present invention comprises, in one aspect, a combination oil washing and gas flotation process for the removal and recovery of oil and any solids contamination from streams of water. The contaminated stream of water is first subjected to an optional gas removal step if considerable gas is present. The thus treated liquid phase is then contacted with a stream of finely dispersed gas bubbles produced by means of a jet flotation device hereinafter described. A great part of the contaminating oil is thus broken from the water stream forming globules which are sufficiently large to permit a partial stratification leaving a residual partially purified water stream. The oil thus separated is then subjected to one or more countercurrent flows of dispersed warm water thereby washing the liberated oil substantially free of emulsion and solids forming a dehydrated oil stream. The partially purified water stream containing residual tight emulsion of oil is subsequently introduced into a flotation operation into which is introduced a recycled stream of high pressure clean water containing dissolved and dispersed flotation gas under pressure. The water phase is again subjected to active gas flotation under conditions wherein the flotation gas dissolved in the clean water recycle is at least partially released and depressured causing the liberation from solution of great quantities of microscopically small bubbles which, it has been found, effectively break the remaining tight emulsion forming a separate oil phase and substantially clean and uncontaminated water phase. The larger dispersed bubbles of flotation gas in the flotation gas in the flotation cell sweep the particles of oil countercurrent to the liquid flow and into the supernatant oil layer. Clean water, substantially free of oil contamination, is withdrawn from the flotation operation. Part of this water is employed as the clean water recycle stream in this operation as well as in the preliminary oil washing and flotation step while the remaining part of the water is removed as a product.

The oil phase liberated in the secondary flotation operation contains substantial quantities of water and is recycled for combination with the raw contaminated water feed for reprocessing and dehydration to produce a dehydrated oil product.

In another aspect, the invention comprises a multi-step flotation operation in which oil-contaminated water is passed successively through a plurality of flotation cells countercurrent to a stream of flotation gas bubbles generated as described above. From each of these cells a stream of liberated oil is withdrawn. Clean water is removed from the last cell in the series and a part of it is pressured and recycled to each individual cell. A flotation gas under pressure is injected into and at least partially dissolved in a clean water recycle stream flowing into the individual flotation cells through the jet flotation device. Microscopic flotation gas bubbles are subsequently formed from the dissolved gas upon the release of the pressure and effectively agglomerate the minute oil particles while the larger dispersed bubbles sweep these particles to the surface.

In any of the flotation steps of the process of this invention, the flotation gas bubbles fall into two classifications according to size. By injecting flotation gas into the water recycle stream, part of the gas is dissolved. Subsequent depressuring of the thus gas-treated water recycle through the jet dispersion device causes liberation of most of the dissolved flotation gas in the form of extremely minute microscopic gas bubbles. These bubbles are believed to be about the same size as the emulsified oil particles and effectively agglomerate them. The undissolved part of the flotation gas is dispersed into larger bubbles by the jet dispersion device and these larger bubbles effectively sweep the small bubble-oil particle agglomerates upwardly through the water phase into the supernatant oil phase. The microscopic bubbles are apparently of the order of from $10^{-4}$ to $10^{-2}$ mm. in diameter while the diameter of the larger dispersed bubbles are of the order of 0.5 to 5 mm. Bubbles of these sizes are believed to be the ones effective to secure the results. Only through the partial dissolution of flotation gas in a recycle water stream and subsequent depressuring and dispersion can these size range of bubbles and the efficient results be obtained.

Specifically the flotation process of this invention is applied to the removal of oil contamination from the oil well brine produced with crude petroleum so that the water may either be injected back into the producing formation free of contaminants to displace additional petroleum or discarded into streams or sewers without adverse effect. Often such oil well brine also contains dissolved oxygen, carbon dioxide, hydrogen sulfide or other gases which make the water corrosive particularly to ferrous metals. This is particularly serious in secondary recovery operations. The flotation process of this invention, using natural gas as the flotation agent, simultaneously separates contaminating oil from the water as well as the dissolved gases such as oxygen, etc., eliminating its corrosivity.

Another application is in the treatment of oil refinery waste water for recovery of hydrocarbons therefrom in a closed flotation system whereby clean water is produced and no hydrocarbons are lost to contaminate the atmosphere. In this case, refinery fuel gas is employed as the flotation agent.

This invention further contemplates the employment of hereinafter defined chemical reagents in combination with the oil washing and/or the flotation steps briefly outlined above. Although it has been found that in most cases the oil washing and/or flotation steps are completely adequate to separate oil contamination efficiently from water streams, contaminated streams which are very difficult to treat otherwise are sometimes encountered in which specific chemical reagents have been highly effective in assisting the separation of the oil emulsions and dispersions.

Figure 1 is a schematic flow diagram of the combination oil washing and multi-cell flotation process of the present invention, Figure 2 is a side elevation view in partial cross section of a multi-cell flotation unit, Figure 3 is an end elevation view of the multi-cell flotation unit, Figure 4 is an elevation view and schematic flow diagram of a modification of the flotation unit, Figure 5 is a detailed view in cross section of the jet dispersion unit employed in the flotation operation, and Figure 6 is a schematic flow diagram of a modified combined flotation and oil washing system.

The discussion of the processes of this invention is hereinafter conducted as though the oil-water mixture was an oil field brine, that is, the water produced in variable quantities simultaneously with crude petroleum and containing emulsified or dispersed petroleum as a contaminant, variable quantities of natural gas as well as finely divided solids. It is to be understood, however, that this choice is by way of illustration only and that other oil-water mixtures including those named above may be similarly treated for the production of a substantially dry oil product and a substantially clean oil-free water product stream as shown in the specific examples.

Referring now more particularly to Figure 1, the total production of crude petroleum, gas, and water from one or a plurality of producing oil wells and which may or may not contain dispersed solids is passed through line 10 at a rate controlled by valve 12 into gas trap 14. This trap permits the removal of natural gas from the liquids and solids portion of the mixture. A liquid level is maintained in the lower portion of trap 14 by means of liquid level controller 16 which serves to actuate control valve 18 and vary the flow rate of liquid removed through line 20 and pump 22. The liberated gases are removed via line 24 at a variable rate determined by back pressure regulator 26 and are sent to production through line 28.

In some instances, the source of the oil-water mixture is at a sufficiently high pressure that liquid flow through the entire process without the use of pump 22 is permitted.

In other cases, the gas content of the material to be treated is low, and in the case of other oil and water mixtures other than crude petroleum production, the gas content is substantially zero. In such instances, the liquid mixture to be treated is passed directly through line 10 through line 30 at a rate controlled by valve 32 into the subsequent treatments described below.

The liquid mixture of oil and water is passed through line 34 and combined with wet recycle oil from the flotation unit flowing through line 36. This material passes through line 38 into primary flotation and oil washing column 40 at an intermediate point. Chemical reagents to assist in the stratification and flotation separation may be added, if required, by means of line 42 at a rate controlled by valve 44.

A partial separation of oil and water phases is effected in column 40 and a supernatant body of oil 46 is maintained in column 40 above the intermediate point at which the mixture is introduced. In the bottom portion of the column is maintained primary flotation zone 48. The liberated oil rises into the supernatant body 46 from which a stream is removed from a point adjacent the top of the column through line 50 at a rate controlled by valve 52 in accordance with liquid level controller 54. In simplified modifications this controller may comprise a weir. Gas is removed from column 40 via line 56 controlled by valve 58 which may comprise a back pressure regulator. The thus removed gas may be combined with or kept separate from gas removed from gas trap 14 as described. Since the gas removed from column 40 comprises essentially the flotation gas injected to primary flotation zone 48 described below and since the flotation gas may or may not be the same as the gas produced from the gas trap, these gases under such conditions are not combined but are recirculated through the primary and secondary flotation systems.

In flotation zone 48 the separated water phase passes downwardly toward the bottom of the column countercurrent to a stream of flotation bubbles generated by means of an injector unit more clearly shown in Figure 5 and described below. A stream of clean water recycle, into which a flotation gas under pressure has been injected, is introduced into the bottom of primary flotation zone 48. Recycled clean water, preferably produced from the secondary flotation zone but which may be removed from the bottom of column 40, is introduced through line 60 at a rate controlled by valve 62 and is combined with a variable stream of flotation gas under pressure flowing through line 64 at a rate controlled by valve 66. The recycled water therefore contains dissolved flotation gas in an amount dependent upon the solubility of the gas and the pressure of injection. This stream is introduced into the bottom of primary flotation zone 48 by means of a jet injector and dispersion unit 68 more clearly shown in Figure 5. Great quantities of flotation gas bubbles are formed as described above and pass upwardly countercurrent to the downward flow of contaminated water. Oil and water emulsions are thus broken and the liberated agglomerated oil particles are carried upwardly into the upper oil washing zone 46.

As above described, this gas is ultimately removed from the top of column 40. Solid materials separated from the liquid system accumulate in the bottom of column 40 and are withdrawn therefrom through line 70 intermittently or at a rate controlled by valve 72. The partially purified water, which includes that which is separated from the liquid feed to the column and the warm water injected into water washing zone 40 at the top of the column, is removed at a point below the injection and dispersion inlet 68 through line 74 at a rate controlled by valve 76. This valve is continuously actuated by differential liquid level controller 78 which maintains the oil-water interface adjacent the liquid feed inlet to column 40 and preferably above this inlet.

Part of the clean water produced in the secondary flotation system is passed from line 60 through line 80 through heater 82 and is subsequently passed through line 84 at a rate controlled by valve 86 into oil washing zone 46. The warm water is dispersed and passes countercurrent to the oil. If desired, chemicals may be introduced into this warm water stream by means of line 88 at a rate controlled by valve 90 to assist in the oil washing step. A rapid heat transfer between the entering warm water and the rising oil occurs in washing zone 46, thus concentrating the heat in the oil washing system only where it is effective. The requirement in conventional systems of heating the entire oil-water stream is hereby eliminated. The oil leaving column 40 is warm and the water passing into primary flotation zone 48 from oil washing zone 46 is cool.

The partially washed oil passing via line 50 from column 40 is introduced into the secondary oil washing column 92 at an intermediate point. Herein the upwardly flowing oil passes through secondary oil washing zone 94 countercurrent to downwardly flowing dispersed warm water introduced from heater 82 through line 96 at a rate controlled by valve 98. Chemically reagents, if desired, may be introduced through line 100 controlled by valve 102 into this warm water stream. Accumulations of gases which may be liberated in column 92 are removed therefrom through line 104 at a rate controlled by valve 106 which may be a back pressure regulator. These gases may be combined with those removed from the top of column 40. Warm dehydrated oil is removed from a point adjacent to the top of column 92 through line 108 at a rate controlled by valve 110 which in turn is actuated by liquid level controller 112. The liquid level is thus maintained in the column by means of the system shown or by means of a simple weir. The dehydrated oil product passes via line 114 to additional washing steps if required or to further processing or storage facilities not shown.

In the bottom of column 92 is settling zone 116 from the bottom of which granular solids which may accumulate are removed through line 118 intermittently or at a rate controlled by valve 120. The further clarified water is removed from the bottom of settling zone 116 through line 122 at a rate controlled by valve 124 in accordance with differential liquid level controller 126, thus maintaining the oil-water interface at a point adjacent to the partially dehydrated oil inlet of column 92. If desired, or in the case where additional washing steps are employed, flotation may be used in the bottom of column 92 also.

The partially clarified water removed as described from column 40 passes via line 128 and is combined with the partially purified water removed through line 122 from column 92. In some instances, this water is sufficiently clean for certain uses and may be employed or discarded in the form in which it is withdrawn from the bottom of the two columns described. Thus, it may pass to production or disposal or further uses through line 130. In such a case, a portion of the water thus produced is recirculated to the bottom of primary flotation zone 48 for use in the jet injection and dispersion unit 68.

The combined streams of water from columns 40 and 92 may be subsequently treated in secondary flotation unit 132. If desirable, flotation chemicals may be injected by means of line 134 at a rate controlled by valve 136 into the inlet water stream. In secondary flotation zone 132 the partially purified water is again countercurrently contacted by a stream of flotation bubbles generated as described above, whereby the residual oil contamination, usually in the form of very tight emulsions, suspensions or dispersions, is freed from the water and accumulates as a supernatant layer of oil. The thus separated oil is wet and is removed through overflow 138 and then passes by means of line 140 and pump 142 at a rate controlled by valve 144 for combination with the feed to tower 40 through line 36 as previously described. If desired, all or a portion of the thus recovered oil may be produced from the secondary flotation unit through line 148 at a rate controlled by valve 146.

The flotation gas accumulating in the top of the flotation unit is removed therefrom through line 150 at a rate controlled by valve 152 as actuated by back pressure regulator 154. This gas may be passed through line 156 for combination with the other gases produced, as described above, or it may be removed through line 158 controlled by valve 160 and repressured for recirculation through secondary flotation zone 132.

The clean water produced is removed from flotation unit 132 through line 162 at a rate controlled by valve 164 and actuated by differential liquid level controller 166. This level control system may comprise a goose neck take off for the lower water layer, if desired.

A portion of the clean water is removed from flotation unit 132 through line 168 and is pressured by pump 170. A part of this stream is passed via line 171 for reintroduction into the bottom of primary flotation zone 48. If desired, flotation accelerating chemicals may be introduced into this stream through line 173 controlled by valve 175. The remaining portion of this clean water recycle is passed through line 172 at a rate controlled by valve 174 and is combined with flotation gas under pressure for passage into the jet injection and dispersion unit 176. The flotation gas under pressure is introduced into the recycle water in line 172 by means of line 178 at a rate controlled by valve 180. This flotation gas may be secured from any of the gas streams or a combination thereof produced from vessels 14, 40, 92, or 132. Thus, this gas may therefore be removed from line 28 through line 182, from line 56 through line 184, from line 104 through line 186, or from line 150 through line 158 in the event that these streams are not combined. In the case where the total gas production is combined, a portion of the combined gas stream flowing through line 188 may be removed therefrom through line 190 for use as the flotation gas.

In any event, the flotation gas is passed via line 192 through compressor 194 and the compressed flotation gas is subsequently divided into two or more streams for use in the process. In the drawing and as described, this pressured flotation gas passes through line 64 into the bottom of primary flotation zone 48 and through line 178 into secondary flotation zone 132.

Referring now more particularly to Figures 2 and 3, a highly desirable modification of the flotation system is shown which has been found extremely advantageous when substituted for secondary flotation unit 132 to produce clean water and dry oil, described in connection with and shown in Figure 1, or is well suited for use by itself for the handling of oil-contaminated water when clean water is the primary desired product. This flotation unit consists of an elongated vessel 200 having the general geometrical shape of a parallelpiped and provided with vertical flow directing baffles, thus forming a plurality of separate flotation zones through which the contaminated water flows in series and in each of which it is countercurrently contacted by a rising stream of bubbles produced by the injection and dispersion device referred to above and shown more clearly in Figure 5 subsequently described. The structure shown in Figure 2 may be fabricated in several modified forms such as a cylindrical vessel with its longitudinal axis disposed horizontally, a plurality of separate vessels through which the contaminated water flows in sequence, and the like. The modification shown is preferred for low pressure operation. The preferred vessel is one with parallel close spaced side walls and is provided with a height between about two and ten times the width and a length between about five and fifty times the width depending on the number of separate cells used. The vessel may be provided with a cover or hood 202 when flotation gases are to be recovered and/or recirculated. These gases are removed through outlet 204 and recirculated.

The vertical baffles comprise a plurality of pairs of primary and secondary baffles which effectively divide the vessel into a multiplicity of separate yet connected flotation zones. In Figure 2, four flotation zones are shown, namely, zones 206, 208, 210, and 212. These zones are separated respectively by primary baffles 214, 216, and 218 which are spaced adjacent secondary baffles 220, 222, and 224, respectively. The primary baffles, in contact with the sides of the vessel, extend from a point above the upper liquid level 226 to a point adjacent the bottom of the vessel. The secondary baffles, also in contact with the sides, extend from the bottom of the vessel to a point approximately half the distance between the bottom and the top and above the lower extremities of the primary baffles. Thus, liquid introduced into the first cell 206 via line 207 passes downwardly and under first primary baffle 214 then upwardly between it and first secondary baffle 220 into second cell 208. Herein the water passes downwardly through the second cell 208 and below second primary baffle 216 then upwardly between it and second secondary baffle 222 into the third cell and so on. The serpentine type of flow continues through all the cells in succession until the last cell in the series is reached. Herein the liquid passes downwardly through the last cell 212, below last primary baffle 228 and upwardly toward an outlet between the last primary baffle 228 and the last secondary baffle 230. The latter baffle may comprise the outlet end of the flotation vessel. The outlet for water from the flotation vessel 202 may comprise weir box 232 provided with variable weir 234. Means 236 are provided for raising and lowering the portion of the weir to control the elevation of the oil-water interface 240. An outlet 238 is provided for clean water from the weir box.

A plurality of oil outlets 242, 244, 246, and 248 are provided, one opening from each of flotation zones 206, 208, 210, and 212, respectively. These outlets may comprise stationary or adjustable weirs. These outlets are positioned somewhat below the upper extremity of the primary baffles and above the upper extremity of weir 234 which controls the position of the oil-water interface level. They are therefore adapted to remove supernatant oil as it accumulates at the top of each of the flotation cells named. Each of these outlets communicates with an oil manifold 250 by means of which the separated oil is removed from the flotation vessel.

A portion of the clean water is removed from the bottom of the flotation vessel at its outlet or through line 252 and is pressured by means of pump 254. The pressured water passes through clean water manifold 256 from which it passes in separate streams into flotation zones 206, 208, 210, and 212 through lines 258, 260, 262, and 264, respectively. The rate of water injection through each of the aforementioned lines is individually controlled by valves 266, 268, 270, and 272, respectively, or is adjusted by orifices or nozzles in the recycle water injection system in each flotation zone.

Adjacent the clean water recycle inlet into each flotation zone, a stream of flotation gas under pressure is introduced from manifold 274 through lines 276, 278, 280, and 282 controlled respectively by valves 284, 286, 288, and 290. If desired, this flotation gas may be withdrawn from the flotation system gas outlet 204 and compressed by compressor 292 for reinjection into manifold 274. Another modification involves the injection of at least part of the flotation gas into the clean water recycle as it leaves recycle pump. It may subsequently be passed through a mixing zone to assure an equilibrium solution of gas in the water as shown in Figure 4.

The bottom of each flotation cell is provided with the injection and dispersion device 294, 296, 298, and 300, respectively, shown in detail in Figure 5. As indicated in Figure 3, these devices are disposed adjacent the bottom of each flotation cell at a level above the bottom of the primary baffles described. In each of the cells, therefore, the water to be treated passes downwardly countercurrent to the rising flotation bubbles and passes in series from cell to cell receiving additional flotation treatment in each cell. The major portion of the suspended and emulsified oil is broken out and separated from the water in the first few cells in the series and the subsequent cells serve to remove residual traces of oil contamination. The oil accumulates in the form of a liquid body overlain by a froth which exists at the top of each cell. The oil is withdrawn via the oil outlets as described above.

The illustration of four flotation zones in series in Figure 2 is merely illustrative. Any number of zones may be employed depending on the degree to which the oil contamination is to be reduced, the quantity of oil contamination in the water to be treated, and the nature of the oil contamination, that is, whether in the form of a dispersion, or an emulsion, or in other forms. In some cases, a single cell may adequately clean up the water, but usually a plurality of from 2 to 20 or more may be required. In most cases, from 3 to 8 cells are adequate. The physical dimensions of the flotation chamber are important to obtaining clean water product and the height must be between 2 and 10 times its width and the length between 2 and 50 times the width depending on the number of cells. The cross section of the cell is preferably regular in shape.

A specific use of the apparatus shown in Figure 2 and described above is in handling the entire effluent from one or more producing oil wells. Preferably with gassy crudes, the gas is removed prior to introduction of the liquid via line 207. With crudes containing only moderate amounts of gas the whole stream may be treated and the gas production being removed via line 204. The major proportion of the oil flows from outlet 242 with decreasing quantities being removed from each successive outlet. Part of the natural gas removed from the top of the flotation unit is compressed and injected as the flotation gas into the recycled water, the remainder being removed as a product.

Referring now more particularly to Figure 4, a modification of multi-cell flotation system is illustrated. A vertical vessel 310 is provided with liquid inlet 312 opening into distributor 313 disposed intermediate the ends of the vessel. The liquid input rate is controlled by valve 314. The upper portion of the vessel contains oil body 315. The flotation gas and any gases introduced with the liquid accumulate in the top of vessel 310 and are removed therefrom through line 316 at a rate controlled by valve 318 in accordance with back pressure regulator 320. The oil production is removed from the top of vessel 310 through line 322 at a rate controlled by valve 324 in accordance with liquid level controller 326 to maintain oil level 328.

The lower portion of vessel 310 below distributor 313 comprises flotation zone 330 provided with a plurality of superimposed jet injection and dispersion units 332, 334, 336, and 338, respectively, above each of which exist individual flotation zones somewhat analogous to those shown in Figure 2. Greater or fewer than four of such units may be employed is necessary to achieve a sufficient degree of flotation to reduce the oil contamination in the effluent water to the desired value. The water passes downwardly through the flotation cells formed between the dispersion devices in zone 330 countercurrent to the rising dispersion of flotation gas bubbles whereby the residual emulsion is broken and the oil floated upwardly into oil body 315. If desired, the injection and dispersion units may be distributed around the periphery of column 310 and may be employed in series of two or more at each level.

The clean water is removed from the bottom of column 310 through line 340 at a rate controlled by valve 342 which is actuated by differential liquid level controller 344 to maintain the oil-water interface 346 at the desired position. A portion of the clean water production is removed from the bottom of the column and passes through line 348 by means of pump 350 into recycle injection water manifold 352. From this manifold, injection water flows through lines 354, 356, 358, and 360, respectively, into the injection and dispersion units shown.

A flotation gas which may be a portion of the gas removed from the top of the column is introduced via line 362, is compressed in compressor 364 and passed either into mixing zone 353 via line 355 controlled by valve 357 wherein it is partially dissolved in the water recycle, or is passed into flotation gas manifold 366 controlled by valve 367. In the latter modification, separate controllable streams of gas are introduced into each injection and dispersion unit by means of lines 368, 370, 372, and 374, respectively. The apparatus shown in Figure 4 is well adapted to the treatment of the entire output of one or more producing oil wells, effecting a very good separation of gases and oil from the water.

Referring to Figure 5, a detailed drawing in cross section of the preferred type of jet injection and dispersion device employed as above described in the various flotation zones is shown. This elongated tubular distributor is provided with recycled water inlet 380 into which opens flotation gas inlet 382. When pre-mixed flotation gas and recycle water are employed, the inlet 382 may be used to supply additional dispersed "large" flotation bubbles or it may be shut off. Tube 380 is flange coupled to wall 384 of a flotation unit and extends through the flange terminating in perforated distributor 386. The mixture of recycled water and injected flotation gas under pressure passes through restriction or jet or nozzle 388 which is coaxially aligned with the throat of Venturi 390. Jet 388 is surrounded by inspiration zone 392 which communicates with the interior of the vessel 384 through inspiration apertures 394.

The high pressure mixture of water and flotation gas is depressured through and ejected from jet 388 through the entrance of Venturi 390 into distributor zone 386. A low pressure is thus established in inspiration zone 392 thereby drawing liquid through inspiration apertures 394 from the interior of vessel 384 for redistribution through distribution zone 386. Upon passage of the mixture of the water and gas into zone 386, the resultant pressure drop causes the liberation of dissolved flotation gas from the water recycle. This gas takes the form of the extremely minute bubbles of gas as discussed above and which are delivered from zone 386 through distribution slots 396.

Although other distributing means, such as canvas socks, porous barriers of various types, and the like, may be employed for the generation of the flotation bubbles, the preferred jet injector is the one shown in Figure 5 which permits the bringing together of recycled flotation water and flotation gas under pressure sufficient to dissolve at least a portion of the flotation gas in the water. The subsequent depressuring of the water generates a flotation bubble stream not otherwise obtainable and results obtained which are unobtainable with any other systems.

Referring now more particularly to Figure 6, a schematic flow diagram of a modified flotation and oil washing system is shown in which the entire mixture of oil and water, such as crude petroleum and brine, is introduced through a gas trap directly into the multi-cell flotation unit shown and the oil produced therefrom is subsequently treated in the oil washing system described in Figure 1, or in a conventional wash tank.

A water and oil mixture is passed by means of line 400 controlled by valve 402 and is introduced into gas trap 404. Gas is removed therefrom through line 406 controlled by valve 408 in accordance with back pressure regulator 410. A portion of the gas may be withdrawn for use in the flotation system through line 412 controlled by valve 414. The liquid is removed from the gas trap by means of line 416 at a rate controlled by valve 418 in accordance with liquid level controller 420. In those cases where little if any gas is present, as in the separation of vegetable oils from water and the like, the mixture may be passed around the gas trap by means of line 422 controlled by valve 424.

In any event, the liquid mixture is passed via line 426 and is combined with a contaminated water recycle from the oil drying step and flowing through line 428. The mixture thus formed is passed through line 430 together with flotation enhancing chemicals introduced, if desired, through line 432 controlled by valve 434 into the first cell of multi-cell flotation zone 436. The operation of the flotation zone and the construction thereof are substantially the same as that disclosed in connection with Figure 2 except that five cells are shown here.

Flotation gas is introduced through line 438 provided with compressor 440 into flotation gas manifold 442.

Recycled clean water is removed from flotation zone 436 through line 444 and recycled by means of pump 446 into recycle water manifold 448. From manifolds 442 and 448 flotation gas and recycled clean water are injected under pressure, in a manner entirely analogous to that described above, into each of the plurality of serially connected flotation cells in multi-cell flotation zone 436. The gas may also be injected into the recycle water immediately following recycle pump 446 as indicated in Figure 4.

The accumulated gas in the top of flotation zone 436 is removed therefrom via line 450 at a rate controlled by valve 452 in accordance with back pressure regulator 454. If desired, all or a portion of this gas may be passed through line 456 controlled by valve 458 for a recompression and re-use as the flotation agent.

The clean, oil-free water is removed from the last cell in the series in the manner described above via line 459 and comprises the clean water product.

Separate oil streams are removed from each of the individual flotation cells in the manner described above and combined in recovered oil manifold 460. From this manifold the recovered oil, containing sometimes a substantial portion of water, may be removed all or in part and may be sent to other processing facilities not shown by means of line 462 controlled by valve 464. Preferably, however, this oil passes through line 466 into production oil washing column or wash tank 472 via distributor 474.

In one modification, the mixture rises through oil washing zone 476 countercurrent to a descending stream of warm wash water. This water is part of the recycled clean water from pump 446 and passes through line 478 together with added chemical reagents, when desired, introduced through line 480 controlled by valve 482 through wash water heater 484. The warm wash water flows through line 486 into the top of oil washing zone 476 from distributor 488 disposed below the supernatant oil level.

In another modification, column 472 comprises a conventional wash tank and no countercurrent hot water wash is employed, e. g., valve 487 is closed. The wet oil, recovered in the flotation zone 436, is passed through manifold 460 and dehydrating heater 467 into column 472. The oil is heated to between about 100° F. and 200° F. whereby residual emulsions are broken. The thus treated oil is allowed to remain in the column (wash tank) for between about 6 and about 36 hours during which time it stratifies forming a supernatant oil layer which is substantially dry and a lower layer of contaminated water.

Gases accumulating in column 472 in either type of operation are removed therefrom through line 490 at a rate controlled by valve 492 in accordance with back pressure regulator 494. The dry oil product is removed from the top of washing zone 476 via line 496 at a rate controlled by a valve 498 in accordance with liquid level controller 500.

The contaminated water passes downwardly through settling zone 502 and is removed therefrom through line 504. This water is pumped by means of pump 506 at a rate controlled by valve 508 actuated by differential liquid level controller 510 and recycled through line 428 as described for reintroduction into first cell of multi-cell flotation zone 436 for retreatment.

Thus in this modification the entire mixture of oil and water is first subjected to a plurality of flotation treatments to produce clean water and recover a wet stream of oil. The wet oil is then washed with a stream of warm water or otherwise dehydrated to produce a substantially dry oil and contaminated water. This water is recycled to the flotation unit shown for recovery of the oil therefrom.

The following data are given as specific examples of the operation of the various modifications of the present invention and are to be understood as illustrations of the operating features and not as limitations of this invention.

Example 1

As a comparison of the conventional means of separating oil and water mixtures, the following operation is one in which oil field brine and crude petroleum are separated in a wash tank. A total of 3000 barrels per day (42 U. S. gallons per barrel) of a mixture of crude petroleum and water is produced from one part of the Playa del Rey field in Southern California. The crude petroleum has a water cut of 90%, that is, it contained 90% by volume of water. This material is passed through a gas trap from which 30 MSCF/D. (1 MSCF/D.=1000 standard cubic feet per day) of natural gas is removed and the oil and water then passed into a wash tank 15 feet in diameter and 24 feet high. A residence time of about 6 hours in the wash tank is provided. The oil is removed from the top of the tank at a rate of about 325 barrels per day and contains between about 10% and 12% water. The separated water is removed from the bottom of the tank at a rate of 2675 barrels per day and contains about 300 p. p. m. of emulsified oil and about 5000 p. p. m. of entrained free oil. The oil stream removed from the wash tank is passed into a plurality of stock tanks each 16 feet high and 20 feet in diameter where it is allowed to stand for prolonged periods and a separation of part of the water is effected. The oil product is removed at a rate of 295 barrels per day containing about 3% water. The contaminated water produced from the wash tank is treated in skim ponds exposed to the atmosphere for the recovery of free oil. However, the 300 p. p. m. of emulsified oil will not settle out even on prolonged standing. This degree of oil contamination is greatly in excess of the maximum amount permitted by local sewage regulations for the disposal of waste water.

Example 2

This operation illustrates the use of the multi-cell flotation treatment for the purification of waste water produced from the conventional wash tank operation shown in Example 1. The raw water stream flows at a rate of 2675 barrels per day which contains 300 p. p. m. emulsified and about 5000 p. p. m. entrained free oil. The multi-cell flotation unit is 10 feet long, 10 feet high, and 2 feet wide and is provided with five flotation cells each 2 feet square in cross section and 10 feet high. The water flows successively through the five flotation cells and is removed at a net production rate of 2655 barrels per day having 8 p. p. m. oil contamination from the fifth cell. A water recycle consisting of 600 barrels per day is withdrawn from the water outlet and injected in substantially equal proportions into the bottom of each of the five cells through a dispersion device. Natural gas as the flotation gas is injected at a rate of 1200 S.C.F./D. (standard cubic feet per day) at a pressure of 55 p. s. i. g. (pounds per square inch guage) into the water recycle flowing at 40 p. s. i. g. Separate streams of recovered oil are removed from the top of each flotation cell at a total flow rate of 20 barrels per day having a 30% water cut. The oil content of the water product at 8 p. p. m. of oil is well below the maximum allowed by local regulations for discharge into municipal sewers.

Example 3

This illustration is one in which the entire oil and water production on part of the Playa del Rey field is treated in the multi-cell flotation system without the use of a conventional wash tank. As will be seen, the equipment is much smaller than the wash tank and skim pond system and the water produced is substantially oil free. A feed stream consisting of 3000 barrels per day of crude petroleum having a 90% cut is passed through a gas trap for the removal of 30 MSCF/D. of natural gas. The 3000 barrels per day of oil and water is introduced into a multi-cell flotation system and passed in series through five cells each 2 feet square and 10 feet high. The water product removed from the last cell flows at a net production rate of 2555 barrels per day and has an oil contamination of 9 p. p. m. A water recycle amounting to 600 barrels per day is withdrawn from the water product stream, pressured to 40 p. s. i. g., and is recirculated for dispersion into the bottom of the flotation cells. Natural gas is employed as the flotation agent and is injected at 55 p. s. i. g. at a rate of 1200 S.C.F./D. into the water recycle stream. The oil product removed from the multi-cell flotation unit flows at a rate of 445 barrels per day and has a 33% cut. As will be seen, the water product has an oil contamination which is considerably reduced from that of the water stream produced by the wash tank operation in Example 1.

*Example 4*

This illustration is one showing an operation of the multi-cell flotation unit in treating the gross crude petroleum production and a simultaneous dehydration of the oil produced therefrom as shown in one modification of Figure 6. The 445 barrels per day of 33% cut oil produced as in Example 3 is passed through a heater and heated to a temperature of 175° F. and discharged into a wash tank 4 feet in diameter and 20 feet high. A residence time of approximately 2.4 hours produces an oil product from the top of the wash tank at a rate of 306 barrels per day having a 2% cut. The water removed from the bottom of the wash tank flows at a rate of 139 barrels per day and has an oil contamination of 300 p. p. m. This stream is recirculated to the multi-cell flotation unit as in Example 3 and a net water production of 2694 barrels per day having 9 p. p. m. oil contamination results. Thus in this operation an oil stream having 2% water and a water stream having 9 p. p. m. of oil are obtained.

*Example 5*

This is an illustration of an operation as shown in one modification of Figure 6 in which the gross crude petroleum product stream is treated with multi-cell flotation and in which the oil product therefrom is subjected to dehydration by means of a countercurrent hot water washing step. The 3000 barrels per day of crude petroleum production having a 90% cut is combined with 339 barrels per day of contaminated water and is introduced into the first cell of the multi-cell flotation system illustrated above. A clean water recycle flowing at 660 barrels per day and 40 p. s. i. g. is injected into the bottom of the flotation system. The flotation gas is natural gas injected at 1330 S.C.F./D. and at 55 p. s. i. g. into the water recycle stream. The oil stream is removed from the flotation cell at a rate of 465 barrels per day having a 35% water cut and is introduced into a treating column 4 feet in diameter and 20 feet high. A water wash consisting of 200 barrels per day of recycle clean water product is heated to 160° F. and countercurrently contacts the oil in the treating column. The products include 303 barrels per day of oil having a 1% cut removed from the treating column and 2697 barrels per day of water containing 8 p. p. m. of oil removed from the flotation cell.

*Example 6*

The following is an illustration of the present invention shown in Figure 1. The 3000 barrels per day of del Rey crude petroleum having a 90% cut is passed through a gas trap from which 30 MSCF/D. natural gas are removed. The liquid phase removed from the gas trap is combined with recycled wet oil from the flotation unit and is introduced into the primary treating column which is 3 feet in diameter and 20 feet high. In the upper portion of the column the oil is countercurrently contacted by 150 barrels per day of 180° F. recycle wash water. In the bottom of the column 150 barrels per day of recycle clean water are injected at 45 p. s. i. g. into which 850 S.C.F./D. of natural gas as the flotation gas is injected at 60 p. s. i. g. Partially purified oil having a 40% cut is removed from the top of the primary treating column at a rate of 500 barrels per day and flows through a degassing zone 12" in diameter and 12 feet high, packed in the upper portion with 6 feet of Raschig rings. The oil is contacted concurrently with 180 barrels per day of 200° F. water recycle. Gas is broken from the oil and removed and the degassed oil flows to an intermediate point in the secondary treating column. The secondary treating column is 4 feet in diameter and 20 feet high. The oil is countercurrently contacted with 200 barrels per day of 180° F. recycle clean water. The oil product removed from the top of the secondary treating column flows at 308 barrels per day and has a 2½% cut.

The impure water removed from the bottom of the primary and secondary treating columns is combined to form a stream flowing at 3194 barrels per day and containing 225 p. p. m. of oil. This contaminated water is introduced to the flotation system wherein it is subjected to countercurrent gas flotation In the flotation system 700 barrels per day of water recycle is employed at 40 p. s. i. g. into which 1500 S.C.F./D. of natural gas for flotation is injected at 55 p. s. i. g. An oil stream amounting to 2 barrels per day and having a 34% water cut is removed from the flotation system and introduced into the primary treating column. Clean water is removed from the flotation system at a rate of 3892 barrels per day of which 500 barrels per day is recycled to the countercurrent washing and the flotation operation in the primary and secondary treating columns and 700 barrels per day is used in flotation. The net water production is 2692 barrels per day and contains 8 p. p. m. of oil.

*Example 7*

This is an illustration of the modification of this invention shown in Figure 4. A treating column 4 feet in diameter and 25 feet high is employed to treat 3000 barrels per day of del Rey crude petroleum having a 90% cut. This material is introduced at a point about 16 feet from the bottom of the column. A water residence time of about 19 minutes is thus provided. The column is maintained at a pressure of 10 p. s. i. g. A clean water recycle removed from the clean water stream flowing from the bottom of the column is pressured to 40 p. s. i. g. and introduced into four jet dispersion devices disposed respectively at the 4, 7, 10 and 13 foot elevations from the bottom of the column. Natural gas for flotation is injected at a rate of 1500 S. C. F./D. and at 50 p. s. i. g. into a water recycle and flotation gas mixing zone disposed adjacent the water recycle pump outlet. Flotation gas is removed from the top of the column. The oil product flows at 416 barrels per day having a 28% cut and the net water production rate is 2584 barrels per day containing 12 p. p. m. of oil.

*Example 8*

A portable pilot unit for experimental water purification by means of flotation according to the principles of this invention was constructed having a length of 5 feet, a height of 5 feet and a 1 foot width provided with five serially connected flotation cells and of a similar construction to that shown in Figures 2 and 3. This flotation system had an approximate capacity range of from 500 to about 2000 barrels per day of oil-contaminated water and a corresponding residence time respectively of from 12.8 to 3.2 minutes.

The unit is employed in the purification of petroleum refinery drainage comprising water heavily contaminated with a mixture of wide boiling range petroleum hydrocarbons. This contaminated stream is passed through the pilot unit at a rate of 1000 barrels per day. Refinery fuel gas consisting essentially of natural gas, but also containing some unsaturated hydrocarbon gases, is employed as the flotation gas. A clean water recycle pressured to 45 p. s. i. g. flows at a rate of 200 barrels per day into which 500 S. C. F./D. of flotation gas is injected at 60 p. s. i. g. The purified water product contains less than 10 p. p. m. of oil contamination and the recovered oil phase has a 27% cut. The flotation gas removed from the closed top of the flotation unit is passed into a hydrocarbon recovery system employing oil absorption thereby effecting a substantially complete recovery of the hydrocarbon contamination in the water and a substantially complete elimination of hydrocarbon vapor losses to the atmosphere.

*Example 9*

The process of Example 8, when carried out at a rate of 700 barrels per day of refinery drainage under the same operating conditions, yields a purified water product containing only 2 p. p. m. of oil due to the reduced flow rate and increased retention time thus provided.

*Example 10*

The pilot flotation unit described in Example 8 is employed for the flotation recovery of aromatic coal tar hydrocarbons contaminating a water stream which is to be sent to disposal from a water washing operation. The water stream contains 280 p. p. m. of coal tar hydrocarbon contamination. The contaminated water is passed at a rate of 1300 barrels per day into the first cell of the pilot unit. A clean water recycle rate of 200 barrels per day at 50 p. s. i. g. is employed. The flotation gas is air injected at a rate of 700 S. C. F./D. and at a pressure of 65 p. s. i. g. into the clean water recycle. The clean water product contains 12 p. p. m. of residual hydrocarbon. The recovered oil phase is subjected to contamination and purification of the recovered oil.

*Example 11*

The pilot unit of Example 8 is employed in the flotation recovery of valuable fish liver oil from contaminated water which is accumulated from fish carcass reduction operations. During operation the contaminated water flows into the flotation unit at a rate of 750 barrels per day. Part of the clean water is recycled at a rate of 165 barrels per day at a pressure of 35 p. s. i. g. Nitrogen is employed as the flotation gas and is injected at a rate of 360 S. C. F./D. and at 48 p. s. i. g. into the water recycle. The clean water product contains only 1.5 p. p. m. of fish oil contamination. Due to the employment of an inert flotation gas, substantially no oxidation of the oil occurs during the flotation recovery.

*Example 12*

The pilot unit of Example 8 is employed in the flotation purification of 900 barrels per day of water contaminated with cotton seed oil. A clean water recycle rate of 190 barrels per day is employed into which 1750 S. C. F./D. of cool filtered flue gas substantially free of oxygen as the flotation gas is injected. The product water contains 10 p. p. m. of residual oil contamination and the recovered oil is not oxidized during the recovery oxidation.

*Example 13*

In one part of the Santa Paula field of Southern California, waste brine is being filtered and reinjected into a subsurface formation to effect secondary recovery operations. The waste brine contains about 30 p. p. m. of oil, 500 p. p. m. of very fine solids and about 4 p. p. m. of dissolved oxygen. This brine is not only very corrosive, due mainly to its high dissolved oxygen content, but it is also very difficult to filter due to its dispersed solids and oil contents.

This brine, flowing at a rate of 450 barrels per day, is treated in the described pilot flotation unit employing natural gas as the flotation gas. The water recycle rate is 90 barrels per day at 20 p. s. i. g. into which 800 S. C. F./D. of natural gas is injected at 32 p. s. i. g. The clean water product contains only 2 p. p. m. of oil, about 100 p. p. m. of dispersed solids, and less than 0.5 p. p. m. dissolved oxygen. The resulting brine is much less corrosive to the steel equipment used in the injection operations, and is much more easily filtered because its oil and dispersed solids contents have been materially reduced.

A considerable variation in the operating conditions of the flotation system of this invention may be made because of the wide variation in the nature of various oil-contaminated waters to be treated.

The flotation gas employed is preferably an inexpensive readily obtained gas, but in those instances where highly valuable oils are to be recovered, such as vitamin A-containing oils, the so-called essential oils etc., purified non-oxidizing gases are preferred such as, for example, carbon dioxide, nitrogen, methane, natural gas, and the like. In many operations air is suitable as a flotation gas. Cooled flue gas may be used in many cases and in the petroleum hydrocarbon refining operations such as those described in Examples 2-7 refinery gas or natural gas is preferred.

In the present process, it has been stated that the flotation gas may be removed from the flotation cell and pressured back into the water recycle for reuse as a flotation agent. One restriction must be placed on the recycling of the flotation gas. In many cases the contaminated water has been exposed to the air or otherwise has obtained a certain degree of oxygen contamination as is the case in secondary recovery operations for crude petroleum production in which water flooding systems are used. The water is highly corrosive to secondary recovery equipment due to the dissolved oxygen. Thus, when flotation gases such as methane, natural gas, refinery gas, hydrogen, carbon monoxide, and the like are employed, the effective simultaneous oxygen stripping of the waste water and a continued recirculation of such gases causes an accumulation of oxygen in the flotation gas recycle. A bleed stream of flotation gas is removed, preferably continuously, from the flotation gas recycle and vented to prevent an explosion hazard.

The quantity of flotation gas necessary varies as a function of the degree of oil contamination and also with the nature of the oil-water mixture. Generally, however, between 0.05 and 5.0 S. C. F./barrel is employed. Preferably between 0.1 and 1.0 S. C. F./barrel is used. Lower rates may be employed where the contamination is desirably reduced to a minimum for disposal. Maximum rates are used where economic conditions dictate a total recovery of oil contamination.

The clean water recycle rate varies somewhat with the solubility of the flotation gas therein and also with the pressure under which this gas is brought into contact with recycle water. Generally, the recycle rate is between 5 and 35 per cent of the raw water feed rate. Usually between 10 per cent and 25 percent recycle gives best results.

The recycle water pressure is variable with the quantity of flotation gas which is desired to be dissolved in the recycle water for subsequent release in the flotation system. Generally, a pressure of between about 10 and 100 p. s. i. g. above the flotation system pressure is desirable.

The flotation gas injection pressure, e. g., the pressure, under which a flotation gas is mixed with the recycle water, is preferably between about 15 and 110 p. s. i. g. above the flotation system pressure and between about 5 and 100 p. s. i. g. above the pressure of the water recycle. This pressure in turn determines, together with the recycle rate, the quantity of flotation gas available for release in the flotation system.

The flotation system pressure is preferably near atmospheric. However, this pressure may be maintained at subatmospheric or in super-atmospheric values as high as 1000 p. s. i. g. Preferably pressures between about atmospheric and 100 p. s. i. g. are employed.

The optimum residence time in the multi-cell flotation system varies with the nature of the oil contamination and with the number of cells. Generally, a residence time of from 1.0 to 60 minutes is adequate for nearly all oil-contaminated waters. In most instances residence times of between about 3 and 15 minutes are fully adequate to effect a substantially complete recovery of oil contamination.

As disclosed in connection with the description of the drawings, provision has been made in the flotation process of this invention for the utilization of supplementary chemical agents to enhance the activity of the flotation and to make more effective the flotation separation of the oil contamination from the water to be purified. It is difficult to determine beforehand those situations in which such chemical reagents will be required. However, it is possible upon experimentation with those contaminated waters, which flotation alone will not purify, to determine the proper reagent or reagents to be used from those described below.

It is believed, although not yet substantiated, that the difficulty of separation of oil contamination from water varies with the size of the contaminating oil particles in the impure water, the presence of ions or solids in the water, the pH, the amount of foreign salts in the water, as well as the degree of contamination. It is believed that the particle size and the amount of oil contamination are most important in unexpectedly making some oil-contaminated water easy to purify while others are very difficult to treat by flotation alone.

For reasons which are not understood, the addition of between 0.001 per cent and 1.0 per cent of water-soluble permanganate salts, depending somewhat upon the amount of oxidizing and reducing materials also present, have been found very effective under flotation conditions in reducing oil contamination in impure waters. Whether these materials can be classed as collectors or frothers is not known but in one instance of heavily oil-contaminated waters derived from Poso Creek (California) oil field and containing about 1000 p. p. m. of oil which is not recoverable by flotation alone, the introduction of 7 p. p. m. of potassium permanganate into the flotation treatment according to this invention with air as the flotation gas for a period of about 6 minutes produces a purified water containing only 5 p. p. m. of oil.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. A process for purification of gas- and oil-containing water and the recovery and dehydration of the recovered oil which comprises flowing the impure water into a gas removal zone, separating gas therefrom, removing the gas-free oil-contaminated feed water stream therefrom and flowing said stream into a first treating and dehydration zone containing a countercurrent gas flotation zone communicating with a superimposed oil washing zone, maintaining an oil-water interface at a point between said washing and flotation zones, countercurrently contacting a body of oil maintained in said washing zone with a stream of heated recycled clean water forming an oil stream of reduced water content and oil-contaminated wash water which passes on into said flotation zone, injecting a flotation gas under pressure into a recycled stream of clean water thereby at least partly dissolving said gas therein, depressuring said recycle water and dissolved gas into said flotation zone whereby flotation gas bubbles are released by dissolution and pass therethrough countercurrent to the water body and into said washing zone, countercurrently contacting said oil stream withdrawn from said first treating and dehydration zone with an additional stream of heated recycled clean water in a second treating and dehydration zone forming a substantially dry oil product and additional oil-contaminated wash water, subsequently passing said oil-contaminated wash water from said first and second treating zones into and successively through a plurality of flotation zones in a multicell flotation zone, removing a stream of clean water from the last zone therein, separating a part of said clean water as said clean water recycle, dissolving a flotation gas under pressure therein, injecting a stream of the flotation gas-containing recycle water into each of said flotation zones whereby the released flotation gas bubbles pass countercurrent to the water flow in each thereof, separating accumulated oil from each of said plurality of flotation zones, combining the resulting stream of wet oil with said oil-contaminated feed water stream for introduction into one of said treating zones, heating a second part of said clean water stream, introducing a first and second portion thereof respectively into said first and second treating zones, and removing the remaining part of said clean water stream as a product from the process.

2. A process for the purification of oil-containing water and for the recovery and dehydration of the recovered oil which comprises establishing a treating zone containing a flotation zone communicating with a superimposed oil washing zone, introducing oil contaminated with water into said treating zone, maintaining a body of oil in said washing zone, maintaining a body of water in said flotation zone, injecting a recycle stream of clean water containing dissolved flotation gas into said flotation zone, depressuring said recycle to liberate flotation gas therefrom whereby emulsified oil particles are agglomerated and carried by the flotation bubbles through said flotation zone countercurrent to water passing therethrough and into said oil washing zone, removing water from said flotation zone, passing a heated stream of recycle water in countercurrent contact with said body of oil through said washing zone and on into said flotation zone forming an oil phase of reduced water content, removing said oil from said washing zone as an oil product, passing said water removed from said flotation zone into a multicell flotation zone, passing said water successively through the plurality of flotation zones therein, injecting and depressuring a stream of clean recycle water containing dissolved flotation gas into each of said flotation zones thereby liberating flotation bubbles which pass countercurrent to the flow of water through each of said flotation zones thereby removing oil contamination, withdrawing separated supernatant oil from each of said flotation zones, recirculating the thus recovered oil to said treating zone for dehydration of the oil phase and purification of the water phase, removing a stream of substantially oil-free water from the last flotation zone in said multicell flotation zone, recycling a portion thereof as said recycle water with said flotation gas into each of said flotation zones, and removing the remainder as an oil-free water product.

3. A process for the purification of oil-contaminated water and the dehydration of the recovered oil which comprises introducing the oil-contaminated feed water stream into a treating zone containing a countercurrent gas flotation zone communicating with a superimposed oil washing zone, maintaining an oil-water interface at a point between said washing and flotation zones, countercurrently contacting a body of oil maintained in said washing zone with a stream of heated recycled clean water forming an oil product of reduced water content and oil-contaminated wash water which passes on into said flotation zone, injecting a flotation gas under pressure into a recycled stream of clean water thereby at least partly dissolving said gas therein, depressuring said recycle water and dissolved gas into said flotation zone whereby flotation gas bubbles are released by dissolution and pass therethrough countercurrent to the water body and into said washing zone, subsequently passing the thus treated water from said flotation zone successively through a plurality of flotation zones in a multicell flotation zone, removing a stream of clean water from the last zone therein, separating a part of said clean water as said clean water recycle, dissolving a flotation gas in said clean water recycle, injecting a stream of the flotation gas-containing recycle water into each of said plurality of flotation zones whereby the released flotation gas bubbles pass countercurrent to the water flow in each thereof, separating accumulated oil from each of said plurality of flotation zones, combining the resulting stream of wet oil with said oil-contaminated feed water stream for introduction into said treating zone, and removing the remaining part of said clean water as a product from the process.

4. A process according to claim 3 in combination with the steps of passing the oil stream withdrawn from said oil washing zone countercurrent to an additional stream of heated recycled clean water forming a substanitally dry oil product and additional oil-contaminated wash water, and introducing said additional wash water into said multicell flotation zone.

5. A process according to claim 3 wherein said oil-contaminated water comprises a mixture of crude petroleum and oil field brine and wherein said flotation gas comprises natural gas, in combination with the preliminary step of passing the petroleum and brine mixture through a gas removal zone, and the step of flowing the liquid product therefrom as said oil-contaminated water stream into said treating zone.

6. A process according to claim 3 wherein said oil-contaminated water mixture comprises hydrocarbon oil refinery waste water drainage and wherein said flotation gas comprises refinery fuel gas.

7. A method for purifying oil-contaminated water and dehydrating the recovered oil which comprises establishing a multi-zoned flotation zone adapted to the flow of water successively through the individual flotation zones thereof, removing a stream of clean water from the last of said individual zones, separating a portion thereof as a clean water recycle stream, injecting a flotation gas under pressure into said clean water recycle under conditions adapted to at least partially dissolve said gas therein, injecting and depressuring a stream of the thus gas-ladened clean water recycle into each of said flotation zones whereby flotation gas bubbles are formed by dissolution of said gas and which bubbles pass countercurrent to the flow of water through each of said flotation zones, disengaging the flotation gas from the top of said multicell flotation system, removing a wet accumulated oil stream therefrom, flowing the thus recovered oil from said multicell flotation zone to a dehydration zone, removing from said dehydration zone a substantially dry oil stream as a product from the process, removing from the dehydration zone an oil-contaminated water stream, and recirculating said contaminated stream into the said multicell flotation zone for purification.

8. A process according to claim 7 wherein said dehydration step comprises the steps of indirectly heating said wet accumulated oil recovered from said multicell flotation zone, passing the thus heated oil into a decantation zone, removing said dry oil stream from said decantation zone, and recirculating said oil-contaminated water from the bottom of said decantation zone to said multicell flotation zone.

9. A process according to claim 7 wherein said wet accumulated oil stream recovered from said multicell flotation zone is dehydrated by the steps of countercurrently contacting said stream in a treating zone with a portion of said clean water recycle heated to a temperature between about 100 and 200° F., removing warm dehydrated oil from said treating zone, and recirculating said oil-contaminated water from said treating zone to multicell flotation zone.

10. A process according to claim 7 in combination with the steps of removing flotation gas after passage through said flotation zone, pressuring at least part of said gas to a super-atmospheric pressure, and reinjecting said pressured flotation gas into said clean water recycle.

11. A process according to claim 7 wherein said clean water recycle comprises between about 5 and 35% of the raw oil-contaminated water flowing into said multicell flotation zone.

12. A process according to claim 7 wherein said flotation gas is injected into said clean water recycle at a rate of between about 0.05 and 5.0 S. C. F./barrel of raw water feed to said multicell flotation zone.

13. A method for the purification of oil-contaminated water which comprises passing an oil-contaminated raw water feed stream successively through a plurality of individual flotation zones in a multicell flotation zone so as to provide therein a water residence time of between about one and about 60 minutes, removing as a clean water recycle a portion of the clean water flowing from the last of said individual flotation zones, controlling said clean water recycle at a rate of between about 5% and about 35% of the flow rate of said raw water feed, combining said clean water recycle with a flotation gas under pressure at a rate of between about 0.05 and about 5.0 S. C. F. per barrel of said raw water feed stream whereby at least a portion of said gas is dissolved therein, injecting and depressuring a portion of the gas-ladened water into each of said individual flotation zones whereby flotation gas bubbles are formed by dissolution of the dissolved portion of gas in the depressuring step and pass with the undissolved portion of gas countercurrent to the flow of water through each individual flotation zone reducing the oil contamination thereof, removing a stream of oil accumulating in said multicell flotation zone as a product of the process, and removing the remaining portion of said clean water from the last of said individual flotation zones as a clean water product.

14. A process according to claim 13 wherein said contaminated water is an oil field brine contaminated with a gas forming a solution corrosive to ferrous metals, and wherein said clean water product is substantially free of said gas.

15. A process according to claim 14 wherein said gas is oxygen.

16. A process according to claim 13 wherein said oil-contaminated water comprises an oil well brine contaminated with crude petroleum and wherein said flotation gas dissolved in said clean water recycle comprises natural gas.

17. A process according to claim 13 wherein said oil contaminated water comprises oil refinery waste water contaminated with liquid hydrocarbons and wherein said flotation gas comprises refinery fuel gas.

18. A process according to claim 13 wherein said oil-contaminated water comprises water contaminated with aromatic coal tar hydrocarbons.

19. A method according to claim 13 wherein said oil-contaminated water comprises water contaminated with fish liver oil and wherein said flotation gas comprises nitrogen.

20. A process according to claim 13 wherein said oil-contaminated water comprises water contaminated with cotton-seed oil and wherein said flotation gas comprises cool flue gas substantially free of oxygen.

21. A process according to claim 13 in combination with the step of adding from about 0.001% and about 1.0% of a water soluble permanganate salt to said oil-contaminated water to enhance the separation of oil therefrom.

22. An apparatus for the purification of oil-contaminated water and the dehydration of the recovered oil which comprises a gas-liquid separator vessel, an inlet conduit thereto for gas- and oil-contaminated water, an outlet conduit for gas opening from said vessel, a first treating column, a conduit for oil-contaminated water opening from said vessel into a said first treating column at an intermediate point, an outlet conduit from the bottom thereof for partially purified water, an outlet conduit from the top of said column for dehydrated oil, a wash water inlet near the top thereof, a secondary treating column, said outlet conduit for oil from said first treating column opening into the side of said secondary treating column, an outlet for dry oil from the top of said secondary treating column, a wash water inlet near the top thereof, an outlet from the bottom thereof for oil-contaminated wash water, a multicell flotation chamber having a plurality of flotation cells serially connected and adapted for the flow of fluid successively therethrough, conduit means for water from the bottom of said first and second treating columns to the water inlet of said multicell flotation chamber, an outlet conduit for clean water from the last flotation cell, means for combining part of said clean water as a recycle under pressure with a flotation gas whereby at least a portion of said gas is dissolved therein, means for injecting and depressuring separate streams of the gas-containing water recycle into the bottom of at least one of said treating columns and into each of said flotation cells, outlet means for oil adjacent the top of said multicell flotation chamber, conduit means for recirculating said oil into one of said treating columns, means for removing gas from the top of said multicell flotation chamber, means for heating a second part of said clean water, means for introducing a first and second portion thereof respectively into said first and second treating columns at said wash water inlets, and means for removing the remaining portion of said clean water as a product stream.

23. An apparatus for the purification of oil-contaminated water and the dehydration of the recovered oil which comprises a treating column, an inlet conduit for oil-contaminated water opening thereinto at an intermediate point, an outlet conduit from the bottom thereof for partially purified water, an outlet conduit from the top of said column for dehydrated oil, a multicell flotation chamber having a plurality of flotation cells serially connected and adapted for the flow of fluid successively therethrough, conduit means for water from the bottom of said treating column to the water inlet of said multicell flotation chamber, an outlet conduit for clean water from the last flotation cell, means for combining part of said clean water as a recycle under pressure with a flotation gas whereby at least a portion of said gas is dissolved therein, means for injecting and depressuring separate streams of the gas-containing water recycle into the bottom of said treating column and each of said flotation cells, outlet means for oil adjacent the top of said multicell flotation chamber, conduit means for recirculating said oil into said treating column, means for removing gas from the top of said multicell flotation chamber, means for heating a portion of said clean water recycle, and means for introducing the heated water recycle into the top of said treating column.

24. An apparatus according to claim 23 in combination with a secondary treating column, said conduit means for oil from said first treating column opening into the side of said second treating column, means for introducing a portion of said heated recycle water into the top of said second treating column, conduit means for water from the bottom of said second treating column communicating with said multicell flotation chamber, and an outlet conduit for dehydrated oil product opening from the top of said second treating column.

References Cited in the file of this patent

UNITED STATES PATENTS

| | | |
|---|---|---|
| 1,116,903 | McClintock | Nov. 10, 1914 |
| 1,235,083 | Wagner | July 31, 1917 |
| 1,703,041 | Imhoff | Feb. 19, 1929 |
| 1,960,914 | McCoy | May 29, 1934 |
| 2,047,989 | Woelflin | July 21, 1936 |
| 2,288,333 | Vinson | June 30, 1942 |
| 2,330,589 | Juell | Sept. 28, 1943 |
| 2,695,710 | Gibbs | Nov. 30, 1954 |